United States Patent [19]

Bohrer et al.

[11] Patent Number: 4,825,693

[45] Date of Patent: May 2, 1989

[54] SLOTTED DIAPHRAGM SEMICONDUCTOR DEVICE

[75] Inventors: Philip J. Bohrer; Robert G. Johnson, both of Hennepin, Minn.

[73] Assignee: Honeywell Inc., Minneapolis, Minn.

[21] Appl. No.: 921,807

[22] Filed: Oct. 20, 1986

Related U.S. Application Data

[63] Continuation-in-part of Ser. No. 656,301, Oct. 1, 1984, abandoned, which is a continuation-in-part of Ser. No. 431,538, Sep. 30, 1982.

[51] Int. Cl.$^4$ .............................................. G01F 1/68
[52] U.S. Cl. ..................... 73/204.25; 338/25; 357/55
[58] Field of Search .................... 73/204, 719–721, 73/725–727; 338/25, 2–5, 292, 293, 308, 318; 357/28, 55

[56] References Cited

U.S. PATENT DOCUMENTS

| | | |
|---|---|---|
| 3,359,462 | 12/1967 | Schutze et al. |
| 3,758,830 | 9/1973 | Jackson. |
| 3,801,949 | 4/1974 | Larrabee. |
| 3,881,181 | 4/1975 | Khajezadeh. |
| 3,992,940 | 11/1976 | Platzer. |
| 4,011,745 | 3/1977 | Gatos et al. |
| 4,071,838 | 1/1978 | Block. |
| 4,129,848 | 12/1978 | Frank et al. |
| 4,134,095 | 1/1979 | Reddy. |
| 4,182,937 | 1/1980 | Greenwood. |
| 4,229,979 | 10/1980 | Greenwood. |
| 4,244,225 | 1/1981 | Greenwood. |
| 4,293,373 | 10/1981 | Greenwood. |
| 4,305,298 | 12/1981 | Greenwood. |
| 4,320,655 | 3/1982 | Kammermaier. |
| 4,332,000 | 5/1982 | Petersen ........................ 361/283 |
| 4,343,768 | 8/1982 | Kimura. |
| 4,371,612 | 2/1983 | Abdelrahman et al. |
| 4,393,702 | 7/1983 | Kohama et al. |
| 4,399,698 | 8/1983 | Hiromasa et al. |
| 4,471,647 | 9/1984 | Jerman et al. |
| 4,472,239 | 9/1984 | Johnson et al. ................. 156/647 |
| 4,478,077 | 10/1984 | Boheer et al. ..................... 73/204 |
| 4,501,144 | 2/1985 | Higashi et al. ................... 73/204 |

OTHER PUBLICATIONS

Bassous, E. et al., "The Fabrication of High Precision Nozzles by the Anisotropic Etching of (100) Silicon" IBM Thomas J. Watson Research Center, Yorktown, NY pp. 1321–1327.

Bassous, E. et al., "Ink Jet Printing Nozzle Arrays Etched in Silicon" IBM Thomas J. Watson Research Center, Yorktown, NY Vol. 31, No. 2, Jul. 1977.

Peterson, K. E., "Bistable Micromechanical Storage Element in Silicon" IBM Technical Disclosure Bulletin, vol. 20, No. 12, May 1978.

Petersen, K. E., "Micromechanical Generation of Acoustic Waves" IBM Technical Disclosure Bulletin, vol. 22, No. 9, Feb. 1980.

Pugacz-Muraszkiewics, I. J., "Detection of Discontinuities in Passivating Layers on Silicon by NaOH Anisotropic Etch" IBM J. Res. Develop., Sep. 1972, pp. 523–529.

(List continued on next page.)

Primary Examiner—Herbert Goldstein
Attorney, Agent, or Firm—C. G. Mersereau

[57] ABSTRACT

An integrated semiconductor device includes a semiconductor body with a first surface having a predetermined orientation with respect to a crystalline structure in the semiconductor body. The semiconductor body has a depression formed into the first surface of the body. A layer of thin film material covers at least a portion of the first surface and includes an electric, thermal-to-electric, or electric-to-thermal element. The diaphragm apparatus forms a slotted diaphragm substantially covering the depression. The slotted diaphragm includes one or more slots sized and oriented so that, in the fabrication of the device, an anisotropic etch placed on the slot or slots will completely undercut the diaphragm and form the depression. The electric, thermal-to-electric, or electric-to-thermal element is substantially supported by the diaphragm and, therefore, is substantially thermally and physically isolated from the semiconductor body.

57 Claims, 5 Drawing Sheets

OTHER PUBLICATIONS

Seidel and Csepreqi, "Studies on the Anisotropy and Selectivity of Etchants Used for the Fabrication of Stress-Free Structures" Extended Abstracts, vol. 82-1, Spring Meeting, Montreal, CA, May 9-14, 1984.

Seidel and Csepregi, "Three-Dimensional Structuring of Silicon for Sensor Applications" Sensors and Actuators, 4(1983), 455-463.

"Integral Type Si Flow Sensor With Heat Insulation Structures" Toyota Central Research Lab (See attached translation).

L. Csepregi, "Micromechanics: A Silicon Microfabrication Technology" Microelectronic Engineering 3 (1985) 221-234.

SLOTTED DIAPHRAGM SEMICONDUCTOR DEVICE

BACKGROUND AND SUMMARY OF THE INVENTION

This application is a continuation-in-part of application Ser. No. 656,301, filed Oct. 1, 1984, now abandoned, which, in turn, is a continuation-in-part of application Ser. No. 431,538, filed Sept. 30, 1982.

Devices of the type disclosed in application Ser. No. 512,079, now U.S. Pat. No. 4,472,239 and in application Ser. No. 431,538, now U.S. Pat. No. 4,478,077 included generic structures and flow sensors which are well suited for many applications. These earlier designs, for example, provide high sensitivity flow sensing, particularly at low flow rates. For high velocity flows, however, the relatively delicate structures of the earlier disclosed designs can be destroyed by high velocity air flows. Further, for some applications it is desirable to provide a sensor on a smaller area of the semiconductor device. The present invention solves both of these problems.

The present invention comprises a semiconductor device and a method for fabricating the semiconductor device.

The semiconductor device comprises a semiconductor body with a first surface having a predetermined orientation with respect to a crystalline structure in the semiconductor body. The semiconductor body has a depression formed into the first surface of the body. A layer of thin film material covers at least a portion of the first surface. Diaphragm apparatus comprising the layer of thin film material and further comprising a static electric element forms a slotted diaphragm substantially covering the depression. The slotted diaphragm comprises a slot sized and oriented so that, in the fabrication of the device, an anisotropic etch placed on the slot will undercut the diaphragm and form the depression. The static electric element is substantially supported by the diaphragm and therefore is substantially thermally and physically isolated from the semiconductor body. The present invention further comprises a method of fabricating a slotted diaphragm semiconductor device comprising a slotted diaphragm of thin film material substantially covering a depression etched into a first surface of a semiconductor body. The method comprises the steps of providing a semiconductor body with a first surface having a predetermined orientation with respect to a crystalline structure in the semiconductor body. The method further comprises applying a layer of thin film material of which the diaphragm is comprised onto the first surface and exposing an area of the first surface through a slot in the layer of the thin film material. The slot is sized and oriented so that an anisotropic etch placed on the exposed surface area will undercut the diaphragm and form the depression. The method also comprises applying the anisotropic etch to the exposed surface area to undercut the diaphragm and create the depression. The anisotropic etch has one of the etch compositions that causes the etching action to substantially terminate at the (111) planes as is well known in the art.

BRIEF DESCRIPTION OF THE DRAWINGS

FIGS. 1–3, 5 and 5A illustrate alternate preferred embodiments of flow sensors constructed in accordance with the present invention.

DETAILED DESCRIPTION OF THE PREFERRED EMBODIMENTS

Figure 1:
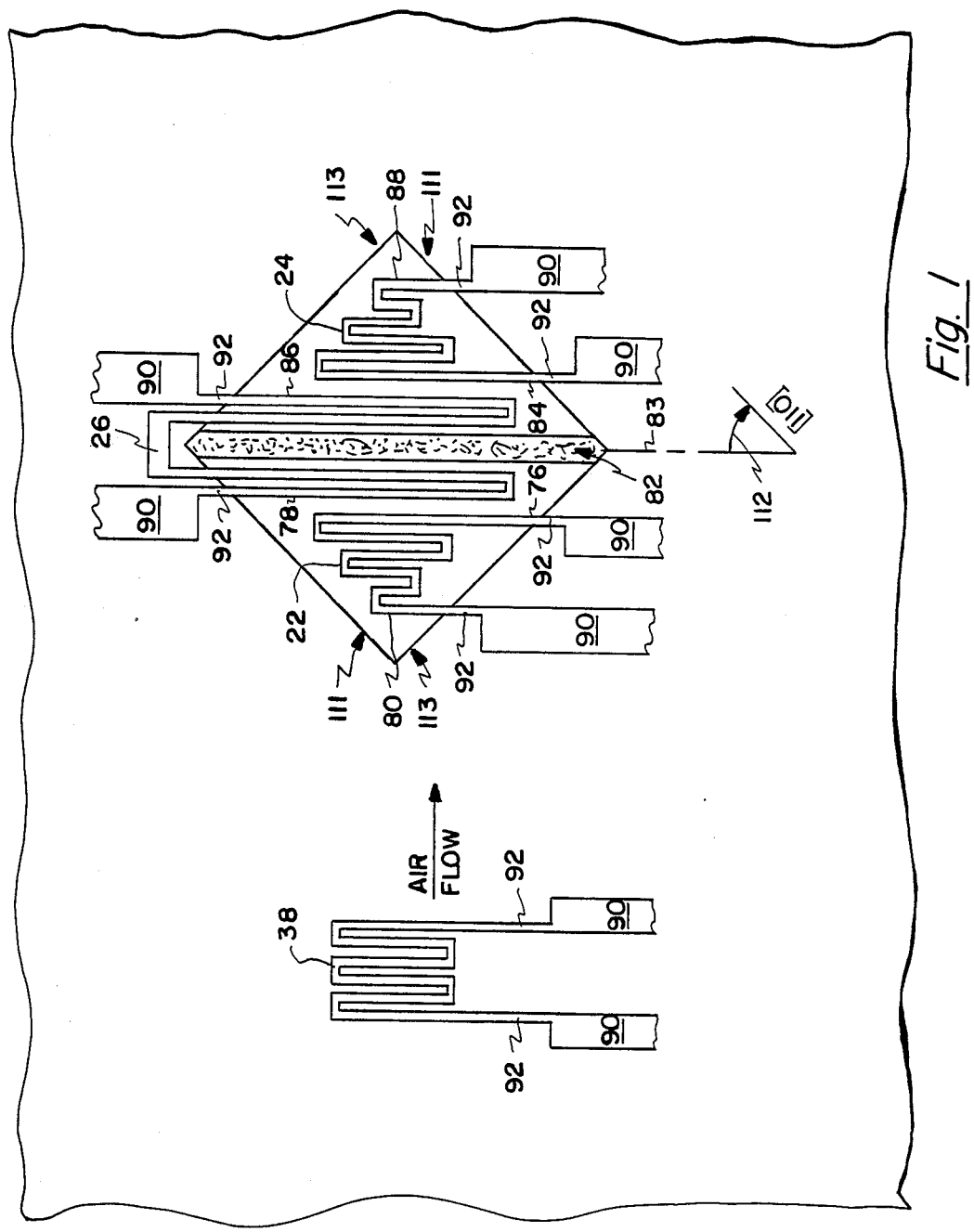

Structures in accordance with the present invention have many applications. The present invention is disclosed using an example of alternate preferred embodiments of a flow sensor compatible with the present invention. The present invention, however, is not limited to flow sensors.

Structures in accordance with the present invention typically comprise static electric, thermal-to-electric, and/or electric-to-thermal elements, supported by a slotted diaphragm substantially covering a depression in a semiconductor body.

The present invention comprises an integrated semiconductor device comprising a semiconductor body 20 with a first surface 36 having a predetermined orientation with respect to a crystalline structure in the semiconductor body. Semiconductor body 20 has a depression 30 formed into first surface 36 of the body. The present invention further comprises a layer 29 of thin film material covering at least a portion of first surface 36.

The present invention further comprises diaphragm means 32 comprising layer 29 of thin film material and further comprising a static electric, thermal-to-electric, or electric-to-thermal element such as elements 22, 24 and 26 further discussed below. Diaphragm means 32 forms a slotted diaphragm 32 substantially covering depression 30. Slotted diaphragm 32 comprises a slot 82 sized and oriented so that, in the fabrication of the device, an anisotropic etch placed on slot 82 will undercut diaphragm 32 and form depression 30. The static electric, thermal-to-electric, or electric-to-thermal element is substantially supported by diaphragm 32 and, therefore, is substantially thermally and physically isolated from semiconductor body 20.

In a preferred embodiment, the present invention comprises a semiconductor body 20 having a depression 30 formed into a first surface 36 of body 20, semiconductor body 20 comprising (100) silicon and having a (100) plane and a <110> direction, first surface 36 of semiconductor body 20 being substantially parallel to the (100) plane. The preferred embodiment of the present invention further comprises a layer 29 of thin film material covering at least a portion of first surface 36. The preferred embodiment further comprises diaphragm means 32 comprising layer 29 of thin film material and further comprising a static electric, thermal-to-electric, or electric-to-thermal element such as 22, 24 or 26 as further discussed below. Diaphragm means 32 comprises a slotted diaphragm 32 substantially covering depression 30, the slotted diaphragm comprising slot 82 oriented at an angle 112 of substantially 45 degrees to the <110> direction and extending across depression 30 at the approximate center of the depression. The static electric, thermal-to-electric, or electric-to-thermal element is substantially supported by diaphragm 32 and, therefore is substantially thermally and physically isolated from semiconductor body 20.

As will be further discussed below, the present invention is adaptable to being configured as a flow sensor. In such configurations, a thin film heater 26 is supported over depression 30 by diaphragm 32. In the preferred embodiment, approximately half of heater 26 is located on each side of slot 82. The preferred embodiment of the present flow sensor further comprises a pair of thin film heat sensors 22 and 24 supported by diaphragm 32. In the preferred embodiment, the thin film heat sensors 22 and 24 are disposed on opposite sides of heater 26.

The present invention further contemplates a method or process of fabricating a device of the class described having a slotted diaphragm 32 of thin film material 29 substantially covering a depression 30 etched into a first surface 36 of a semiconductor body 20. Contemplated steps include providing a semiconductor body 20 with a first surface 36 having a predetermined orientation with respect to a crystalline structure in the semiconductor body, applying a layer 29 of thin film material, comprising diaphragm 32, onto first surface 36, exposing first surface 36 through a slot or slots as at 82 in layer 29 of the thin film material and applying the anisotropic etch to the exposed surface area to undercut diaphragm 32 and create depression 30. Slotting is sized and oriented so that an anisotropic etch placed on the exposed surface area will undercut diaphragm 32 and form depression 30.

A preferred method of practicing the present invention comprises providing a semiconductor body 20 contemplates (100) silicon and having a (100) plane and a <110> direction, first surface 36 of the semiconductor being substantially parallel to the (100) plane. A layer of thin film material of diaphragm 32 is added to first surface 36. A slot 82 is fabricated through the layer of thin film material oriented at substantially 45 degrees to the <110> direction. The slot defines a length which determines the maximum width of depression 30 as measured along the slot oriented at substantially 45 degrees to the <110> direction. An anisotropic etch is applied to the exposed surface area to undercut diaphragm 32 and create depression 30.

In a further preferred embodiment of the present invention, depression 30 is bounded at first surface 36 by a substantially square configuration comprising four substantially perpendicular boundary edges 111 and 113, each of the four substantially perpendicular boundary edges being substantially in line with or substantially perpendicular to the <110> direction.

In this embodiment, slotted diaphragm 32 comprises slot means comprising first and second slots 82A and 82B located on a line 83 oriented at an angle 112 of substantially 45 degrees to the <110> direction. Each of first and second slots 82A and 82B comprise a first end 200A and 200B respectively, first and second slots 200A and 200B being located at a maximum width of depression 30 as measured along line 83. Each of the first and second slots 82A and 82B have a second end 202A and 202B respectively, ends 202A and 202B being located so that each of the first and second slots 82A and 82B extend only a portion of the distance across the maximum width of depression 30 as measured along line 83.

The further preferred embodiment further comprises third, fourth, fifth and sixth slots 82C, 82D, 82E and 82F oriented substantially in line with or substantially perpendicular to the 110 direction, each of the third, fourth, fifth and sixth slots being similarily situated substantially central to one of the four boundary edges 111 and 113. Each of the third, fourth, fifth and sixth slots 82C, 82D, 82E and 82F is of a length sufficient to permit complete cooperative undercutting of diaphragm 32 when an isotropic etch is placed on the areas exposed by each of the six slots as is further explained below.

When configured as a flow sensor, the further preferred embodiment comprises a thin film heater 26 supported over depression 30 by diaphragm 32. Approximately half of heater 26 is located on each side of line 83. In that embodiment, a pair of thin film heat sensors 22 and 24 are supported by diaphragm 32, thin film heat sensors 22 and 24 being disposed on opposite sides of heater 26.

The method of fabricating the further preferred embodiment comprises exposing first and second areas of first surface 36 through first and second slots 82A and 82B in layer 29 of the thin film material. First and second slots 82A and 82B are located on a line 83 oriented at substantially 45 degrees to the <110> direction. Each of the first and second slots 82A and 82B comprise a first end 200A and 200B respectively located at a maximum width of depression 30 as measured along line 83. Each of the first and second slots 82A and 82B have a second end 202A and 202B respectively located so that each of the first and second slots extends only a portion of the distance across the maximum width of the depression as measured along line 83.

Third, fourth, fifth and sixth areas of first surface 36 are exposed through third, fourth, fifth and sixth slots 82C, 82D, 82E and 82F in thin film layer 29. The third, fourth, fifth and sixth slots 82C, 82D, 82E and 82F are oriented substantially in line or substantially perpendicular to the 110 direction, there being one of the third, fourth, fifth and sixth slots 82C, 82D, 82E and 82F located at the substantial center of each of the four boundary edges 111 and 113. Each of the third, fourth, fifth and sixth slots have a length sufficient to permit undercutting of diaphragm 32 when an anisotropic etch is placed on each of the six slots. The anisotropic etch is applied to the exposed surface areas to undercut diaphragm 32 and create depression 30.

In a third preferred embodiment of the present invention, as in the above-described embodiments, depression 30 is bounded at first surface 36 by a configuration of pairs of substantially perpendicular boundary edges 111 and 113, each of the four boundary edges is situated substantially in line with or substantially perpendicular to the <110> direction.

In this embodiment, as depicted in FIG. 5a, slotted diaphragm 32 includes slot means having a plurality of spaced, axially aligned slots or segments as illustrated by 82G, 82H, 82I and 82J located on line 83 oriented at angle 112 which is substantially 45 degrees to the <110> direction. Each of the outer slots 82G and 82J have a first or outer end 300G and 300J respectively. Points 300G and 300J define the maximum width or extremes of depression 30 as measured along line 83. Each of the slots 82G and 82J have a second end 302G and 302J respectively. Ends 302G and 302J are located so that each of the slots 82G and 82J extend only a portion of the distance across the maximum width of depression 30 as measured along line 83.

The additional spaced slots or segments 82H and 82I, intermediate and aligned with slots 82G and 82J, have respective ends 300H, 302H and 300I and 302I as shown. If each of the slots be assigned an arbitrary width W and the interslot distance separating or axial spacing of the slots 82G through 82J be defined as D, the only size limitation is that W>D. As illustrated in FIGS. 5 and 5A, if this requirement be met, slots 82G through 82J present a composite exposure of surface 36 sufficient to permit complete undercutting of diaphragm 32 when an anisotropic etch is placed on each of the slots or segments.

Thus, in the embodiment of FIG. 5, the etching proceeds beneath the diaphragm first between the slot ends as illustrated in FIG. 5a, and the necessary requirement of the dimensions of the space between slot ends relative to slot widths such that W>D became more apparent when the etching process is addressed in further detail. When this requirement is met, the etching action proceeds from the end of slot 82I toward the limit of the dashed lines 114, which limit overlaps the corresponding dashed line limit 115 of the etch proceeding from the end of slot 82J. The composite overlapping patterns of this first etching action including slots 82G and 82H, creates a continuous narrow cavity along centerline 83 within the final etch pit boundaries 111 and 113. The etch can then proceed laterally from this continuous narrow cavity to the etch-stop limit boundaries 111 and 113 which boundaries lie beyond the dashed line local pit limits of individual slots 82G, 82H, 82I and 82J.

The third preferred embodiment illustrates four slots or slot segments.

Of course it will readily be appreciated that the number and size of the slots used may be varied according to the particular application involved and there is nothing sacred about the number illustrated.

Body 20 is preferably a semiconductor body and preferably silicon, chosen because of its adaptability to precision etching techniques and ease of electronic chip producibility. The preferred embodiment of a flow sensor in accordance with the present invention preferably includes two identical temperature sensing resistor grids 22 and 24 acting as thin film heat sensors and further includes a centrally located heater resistor grid 26 acting as a thin film heater. Sensors 22 and 24 and heater 26 are preferably fabricated of nickel-iron, herein sometimes referred to as permalloy, having a preferred composition of 80 percent nickel and 20 percent iron. The sensor and heater grids are typically encapsulated in a thin film of dielectric, typically comprising layers 28 and 29 and preferably silicon nitride to form thin film diaphragms 32. The preferred embodiment of devices fabricated in accordance with the present invention further comprise an accurately defined air space 30 between diaphragm 32 and semiconductor body 20. Air space 30 effectively results in an area space on each side of diaphragm 32. Effectively placing an air space on each side of diaphragm 32 is achieved by fabricating the structure on silicon surface 36, and by subsequently etching an accurately defined air space 30 into silicon body 20 beneath diaphragm 32.

In the embodiment illustrated in FIG. 1, slot 82 cut through nitride layer 29 to expose an area of first surface 36 can be quite narrow, 5 microns for example. The anisotropic etch removes the silicon in the form of a square depression 30 bounded by substantially perpendicular boundary edges 111 and 113, boundary edges 111 illustrated being substantially in line with the <110> direction and boundary edges 113 as illustrated being substantially perpendicular to the <110> direction. Of course, a wider slot will provide more rapid diffusive removal of etch product and thus reduce the time required to complete depression 30.

Figure 1A:
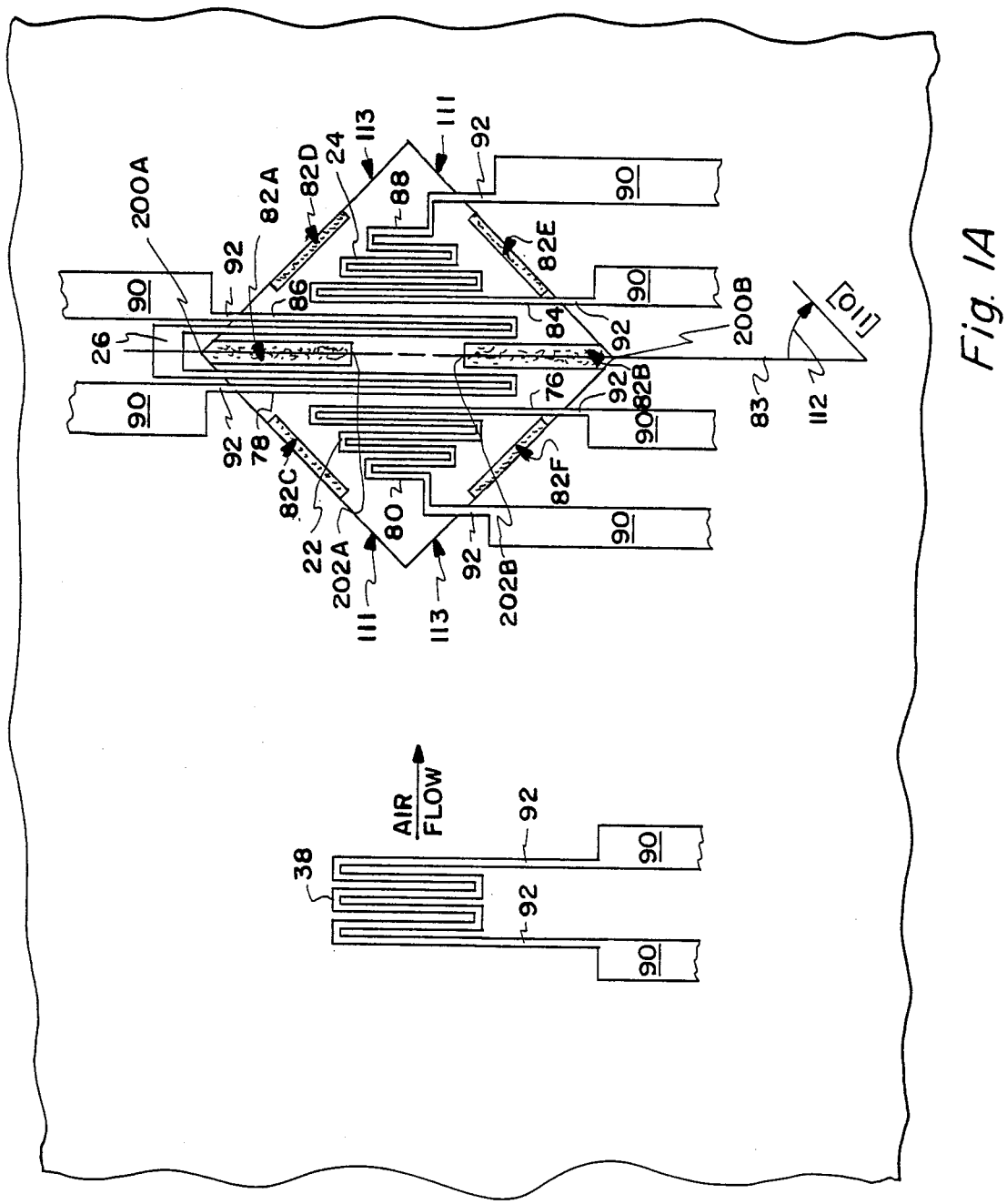

In the embodiment illustrated in FIG. 1A, the longer slot 82 illustrated in FIG. 1 is divided into two shorter slots 82A and 82B with a broad section of silicon nitride supporting film (layers 28 and 29) connecting the right and left sides of diaphragm 32. This connection further strengthens the silicon nitride supporting film and further prevents penetration of airflow under the more vulnerable central part of diaphragm 32. Accordingly, the embodiment of FIG. 1A is stronger for high velocity flow applications than the embodiment of FIG. 1.

Figure 1B:
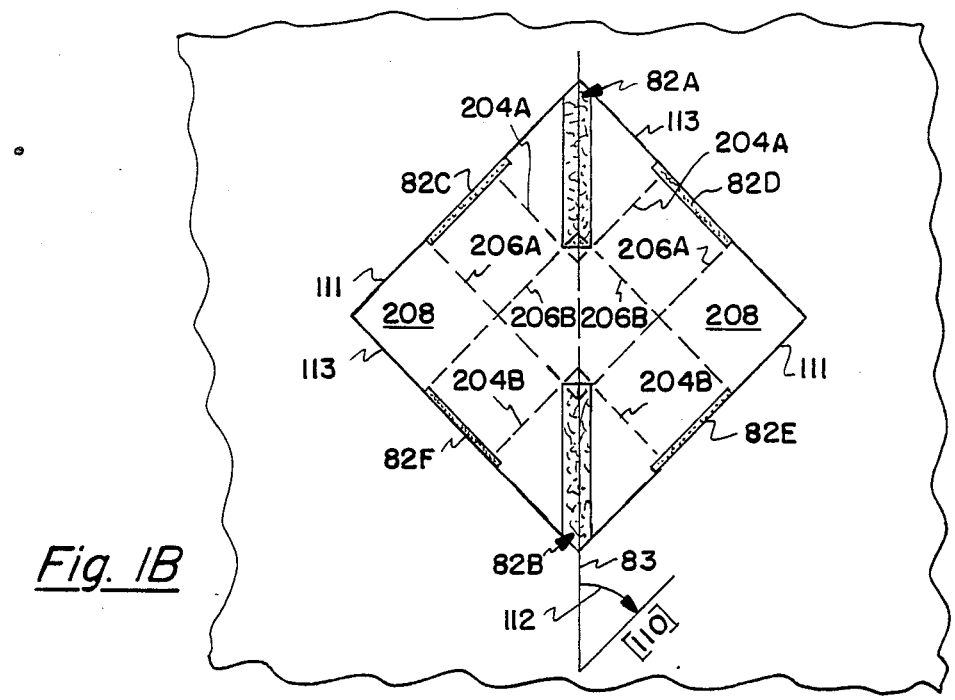
Figure 2:
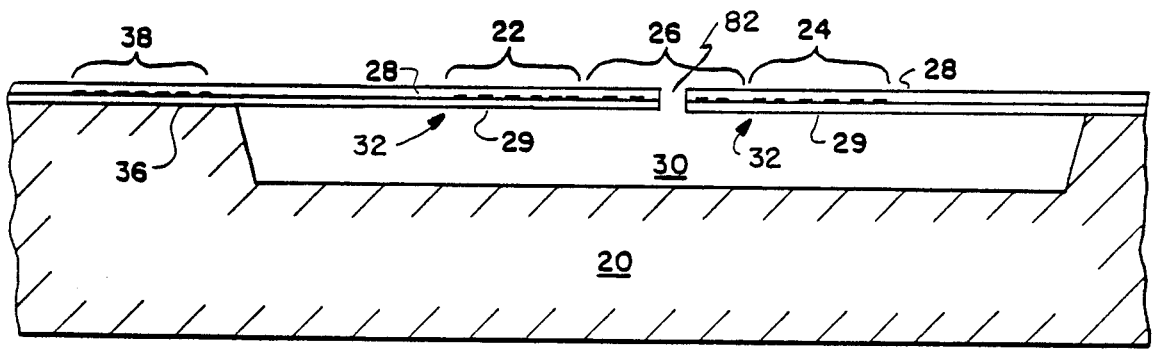

However, slots 82A and 82B by themselves do not permit the anisotropic etch formation of the entire desired diaphragm 32 because the corresponding etch pits that would be created from slots 82A and 82B are limited to the vicinity of these slots as shown by dashed lines 204A and 204B respectively in FIG. 1B. Thus, it is necessary to form slots 82C, 82D, 82E and 82F approximately centrally located on boarder edges 111 and 113 and having a sufficient length so that the depressions formed through slots 82C, 82D, 82E and 82F slightly overlap the local depressions formed through slots 82A and 82B. After the depressions adjacent to slots 82A and 82B are formed (these local depressions being defined by dashed lines 204A and 204B respectively), a second stage of etching begins, and the depression bounded previously by dashed line 204A is enlarged to a larger depression bounded by dashed line 206A; similarly, the depression previously bounded by dashed line 204B is enlarged to a larger depression now bounded by dashed line 206B and overlapping the depression bounded by line 206A. The final depression dimensions are formed in a third and last stage of etching where regions 208 are etched out, thus resulting in a square depression having the same dimensions as in FIG. 1.

Slots 82C, 82D, 82E and 82F can be even narrower than slots 82A and 82B, 3 microns for example, because the diffusive access of the anisotropic etch to the space beneath the diaphragm can be adequately provided by slots 82A and 82B, and the additional access provided by slots 82C, 82D, 82E and 82F only speed up the etching process.

The operation of the present sensor in sensing air flow can be described with reference to FIG. 1. Heater resistor grid 26 operates at a preferred constant average temperature difference of 100–200 degrees centigrade elevated above the temperature of silicon chip 20 which temperature is not appreciably different from the ambient air stream temperature.

In the preferred embodiment illustrated, sensor grids 22 and 24 are precisely symmetrically located with respect to heater grid 26 so that at zero airflow they have identical temperatures and have no differences between their resistances. Consequently, a small probe current, 0.1–1.0 milli-amperes preferred, through both sensor resistances 22 and 24 will develop no voltage difference at zero airflow velocity.

With airflow present, upstream sensor 22 will be cooled by the transportation of heat away from sensor 22 toward heater resistor grid 26, whereas downstream sensor 24 will be heated by a transportation of heat toward the sensor from heat resistor grid 26. Consequently, a resistance difference between sensor resistances 22 and 24 will be present with a corresponding difference in voltage drop which is a measure of the air flow. Typical unamplified voltage differences can be as high as 0.1 volt at a 1500 feet/minute flow velocity.

In the preferred operation of the present sensor, sensors 22 and 24 are operated with constant current such that temperature field changes can be sensed under flow conditions as previously described. Other operating arrangements are also possible.

Because of the exceedingly small thermal mass of the heater and sensor element structure and the thermal insulation provided by the thin silicon nitride connecting means to the supporting silicon body, and because of the surrounding air space, response time of the present sensor is very short, with response time constants of 0.005 seconds having been measured. Consequently, sensor elements 22 and 24 can respond very rapidly to air flow changes.

In the preferred embodiment of the present sensor, ambient temperature is monitored by a reference resistor 38 which is heat sunk onto semiconductor body 20. Resistor 38 may be a permalloy grid formed substantially like grids 22, 24 and 26 and is typically encapsulated in dielectric layers 28 and 29 and mounted on surface 36.

The typical 0.8 micron total thickness of dielectric layers 28 and 29 is very thin and, accordingly, permits relatively good heat conduction and transfer perpendicular to the layers to and from resistive grids 22, 24, 26 and 38. Thus, reference resistor 38, being attached by the encapsulating dielectric directly to surface 36 of semiconductor body 20, readily monitors the temperature of the semiconductor body, which stays within 0.5 degrees centigrade of ambient temperature even with resistor grid 26 elevated to 200 degrees centigrade above ambient. Accordingly, heat sunk reference resistor 38 may be used to monitor ambient air flow temperature by monitoring a temperature that is very close to that of semiconductor body 20, which in turn is very close to ambient temperature.

Figure 4:
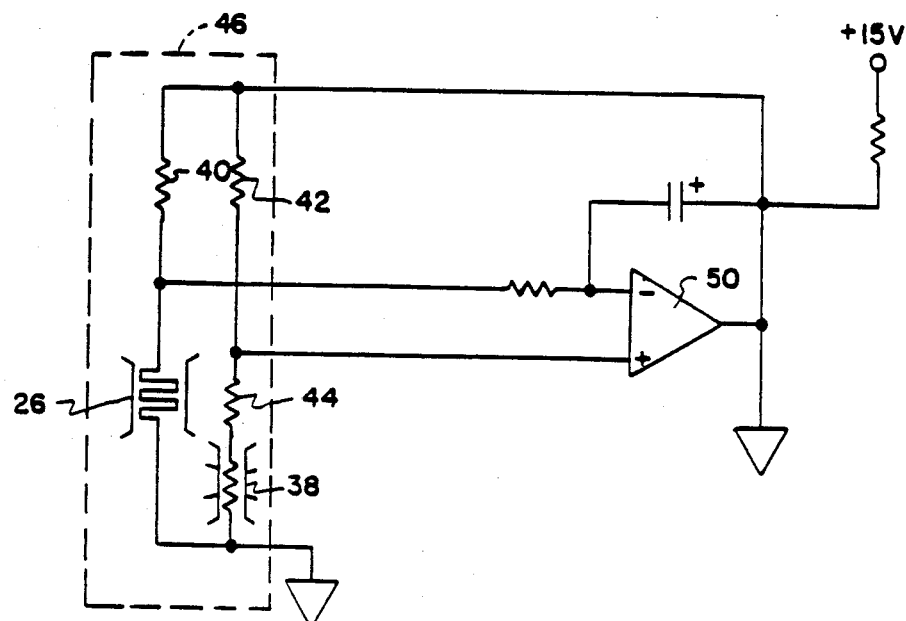
FIG. 4 illustrates circuitry for operating the disclosed flow sensor.
Figure 4:
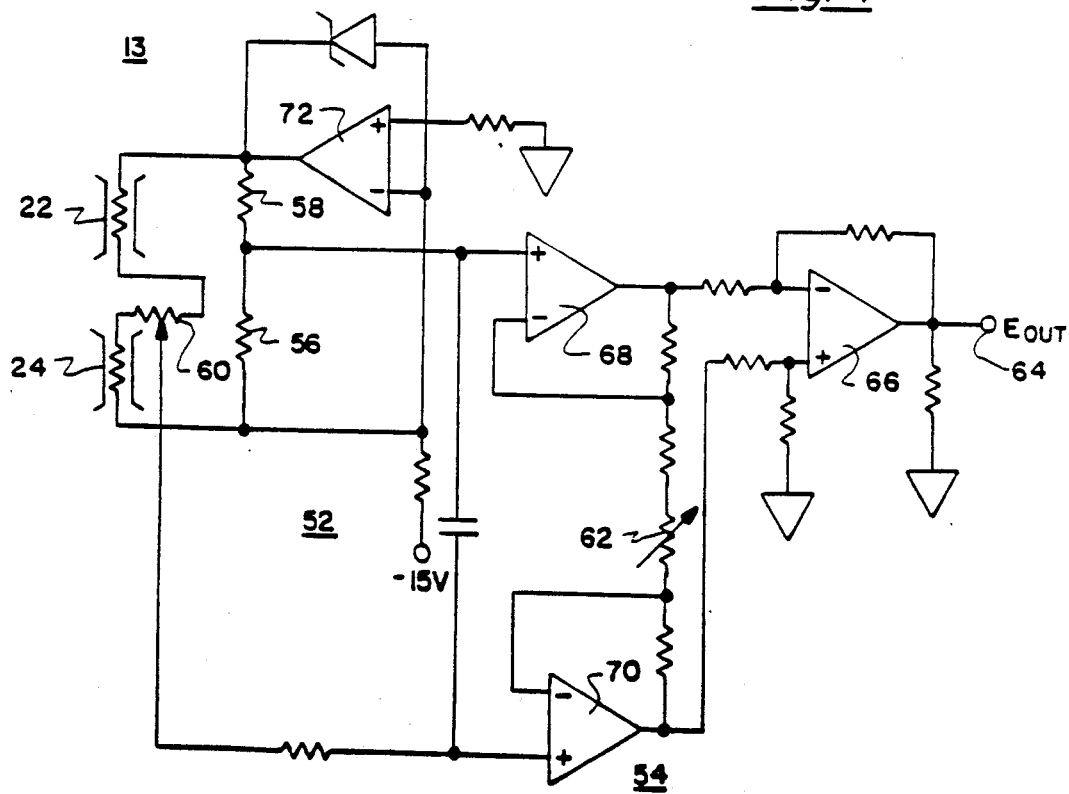

As previously indicated in the preferred operation of the present sensor, heater 26 is operated at a constant temperature above ambient temperature, sensors 22 and 24 being operated at constant current, and the changing temperatures of sensors 22 and 24 are sensed as changes in resistance. Circuits for accomplishing these functions are illustrated in FIG. 4. The smaller circuit controls the temperature of heater 26 while the larger circuit provides an output voltage that is proportional to the resistance difference between heat sensing resistors 22 and 24.

The heater control circuit illustrated in FIG. 4 uses a wheatstone bridge 46 to maintain heater 26 at a constant temperature rise above ambient as sensed by heat sunk reference resistor 38. Wheatstone bridge 46 is shown comprising heater resistor 26 and a resistor 40 in its first leg and a resistor 42, heat sunk resistor 38 and a resistor 44 in its second leg. An error integrator comprising amplifier 50 keeps bridge 46 balanced by varying the potential across it and thus the power dissipated in heater 26.

The circuity which monitors the resistance difference between downstream sensor 24 and upstream sensor 22 includes a constant current source 52 comprising an amplifier 72 and a differential amplifier 54 comprising amplifier 68 and 70. The constant current source drives a wheatstone bridge comprising two high impedance resistors 56 and 58 in one leg and the two sensing resistors 22 and 24 with a nulling potentiometer 60 in the other leg. The gain of differential amplifier 54 is adjusted by potentiometer 62. Output 64 provides a voltage that is proportional to the resistance difference between the two sensing resistors 22 and 24.

Amplifiers 50, 66 and 72 may each comprise one-fourth of an LM324. Amplifiers 68 and 70 may each comprise one-half of an OP-10.

Upstream sensor resistor 22 preferably has an inner edge 76 in close proximity (5 to 10 microns, for example) to the near edge 78 of heater resistor grid 26 At such a separation from near edge 78 of heater resistor grid 26, the zero flow air temperature near heater resistor edge 78 is close to that of edge 78. In a typical embodiment, where sensors 22 and 24 have a width of approximately 100 microns, outer edge 80 of sensor resistor grid 22 is located approximately 100 microns from near edge 78 of heater resistor grid 26. At the 100 micron separation, the zero airflow temperature is closer to that of the ambient air stream and to that of silicon chip 20 than it is to the temperature of heater resistor 26.

Therefore, outer edge 80 of sensor resistor grid 22 is easily cooled to near the limiting temperature of silicon chip 20 by low velocity airflow, whereas the inner regions of sensor resistor grid 22 (near edge 76) are more tightly coupled thermally to heater resistor 26 and respond more readily to the higher airflow velocity before the limiting temperature of the ambient airstream is approached. Accordingly, the composite effect of the temperature change from each resistor grid line (lines spaced over the approximately 5–100 micron distance from heater edge 76) for an increment of airflow is to keep the corresponding increment on the upstream resistor temperature response curve more nearly constant over a broad airflow range.

As shown in FIG. 1, area 82 (and areas 82A–82F) are cut in the silicon nitride to facilitate etching as further described below. Overall geometry, including that of leads 92, is preferably made symmetrically to insure symmetrical heat conduction properties. Leads 92 connect to pad areas 90 for electrically connecting sensor elements 22, 24, 26, and 38 with circuitry 13 as previously discussed.

Elements 22 and 24 have a preferred resistance in one example of 1200 ohms and element 26 has a preferred resistance in that example of 520 ohms. In this embodiment, sensors 22 and 24 have a width of approximately 100 microns and a length of approximately 175 microns. As previously indicated, in this example the proximal edges of sensors 22 and 24 are in close proximity (e.g., 5–10 microns) away from heater 26. That is, edge 76 of sensor 22 is 5–10 microns away from edge 78 of heater 26, and edge 84 of sensor 24 is 5–10 microns away from edge 86 of heater 26.

As with other dimensions listed in the present application, the above dimensions are preferred dimensions which have been used in actual devices and are not deemed to be limiting, since these parameters could be substantially varied depending upon application.

The preferred process of fabricating the present sensor comprises providing a (100) silicon wafer 20 having a surface 36 which receives a layer 29 of silicon nitride. Layer 29 is typically 4000 angstroms thick and is typically deposited by standard sputtering techniques in a low pressure gas discharge. Next, a uniform layer of permalloy, typically 80% nickel and 20% iron and 800 angstroms thick, is deposited on the silicon nitride by sputtering.

Using a suitable photo mask, a photoresist and a suitable etchant, permalloy elements such as 22, 24, 26 and 38 are delineated. A second layer 28 of silicon nitride, typically 4000 angstroms thick, is then sputter-deposited to provide complete coverage of the permalloy configuration and thus protect the resistive element from oxidation. Openings such as 82 and 82A–82F are then etched through the nitride to the (100) silicon surface in order to delineate slotted diaphragm 32. The relative sizes of openings such as 82 and 82A–82F are largely a matter of design choice.

Anisotropic etchant that does not appreciably attack the silicon nitride is used to etch out the silicon in a controlled manner from beneath diaphragm 32 (KOH plus Isopropyl alcohol is a suitable etchant). The sides of the etched depression such as 30 are bounded by (111) and other crystal surfaces that are resistive to the etchant. The depression bottom, a (100) surface which is much less resistant to the etchant, is located at a specified distance (e.g., 125 microns) from the members, typically by adjusting the duration of the etch. A doped silicon etch stop (e.g., a boron-doped layer) may also be used to control the depth of the depression, although such stops are not typically necessary when fabricating the present sensor. By adjusting the duration of the etch, the depth of depressions such as 30 can be controlled to a precision of about three microns or to about two percent. This precision results in a precise reproducibility of the thermal conductance of the air space surrounding diaphragm 32 and a correspondingly precise reproducibility of air flow response.

Figure 3:
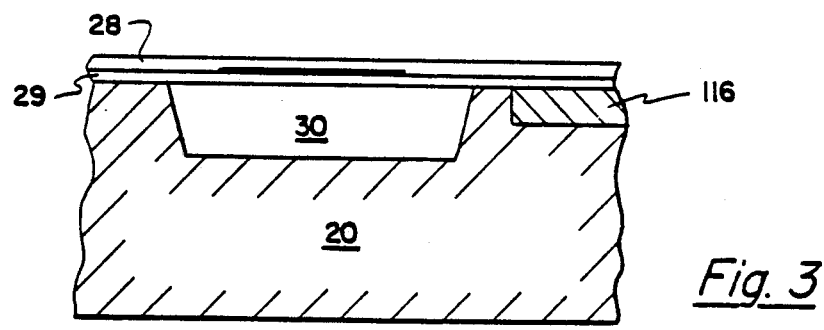

FIG. 3 shows a region 116 for integration of circuitry, for example, portions of the circuitry illustrated in FIG. 4.

For the embodiments shown, diaphragm 32 is typically 0.8–1.2 microns thick. Typical permalloy elements such as elements 22, 24, 26 and 38 have a thickness of approximately 800 angstroms (typically in the range of approximately 800 angstroms to approximately 1600 angstroms) with a preferred composition of 80% nickel and 20% iron and a resistance value within the range of approximately 200 ohms to approximately 2000 ohms at room temperature, e.g., at approximately 20–25 degrees centigrade (at permalloy element temperatures up to approximately 400 degrees centigrade resistance values increase by a factor of up to approximately 3). Line widths within permalloy grids may be approximately 5 microns with a 5 micron spacing. Depressions such as 30 typically have a 0.005 inch (125 micron) depth spacing between members such as 32 and 34 and the semiconductor body such as 20, but the spacing can easily vary in the range of approximately 0.001 inch to approximately 0.010 inch. A typical thickness of the semiconductor body or substrate such as 20 is 0.008 inch. (As previously indicated, dimensions provided are illustrative only and are not to be taken as limitations.)

Typical operating temperatures of heater elements such as 26 are in the range of approximately 100–200 degrees centigrade with approximately 160 degrees centigrade above ambient being the preferred operating temperature. Using the preferred permalloy element, this can be accomplished with only a few milliwatts of input power.

A heater resistance element having a 200–1000 ohm preferred resistance at 25 degrees centigrade provides the desired power dissipation to achieve the preferred operating temperature at a convenient voltage of a few volts and a convenient current of, for example, 2 to 5 milliamperes.

The present invention is to be limited only in accordance with the scope of the appended claims since persons skilled in the art may devise other embodiments still within the limits of the claims.

The embodiments of the invention in which an exclusive property or right is claimed are defined as follows:

1. An integrated semiconductor device, comprising:
   a semiconductor body with a first surface having a predetermined orientation with respect to a crystalline structure in the semiconductor body, the semiconductor body having a depression formed into the first surface of the body;
   a layer of thin film dielectric material covering at least a portion of the first surface; and
   a slotted diaphragm comprising the layer of thin film material and further comprising an electric element, the slotted diaphragm substantially covering the depression, the slotted diaphragm further comprising a single slot extending across the diaphragm from one extremity to the other, the slot having first and second ends intersecting the first surface of the semiconductor body, the slot being substantially centered on the diaphragm and being oriented so that, in the fabrication of the device, an anisotropic etch placed on the slot will undercut the diaphragm and form the depression, the electric element being substantially supported by the diaphragm and, therefore, substantially thermally and physically isolated from the semiconductor body.

2. The apparatus of claim 1 wherein the static electric element comprises a thermal-to-electric transducing element.

3. The apparatus of claim 1 wherein the electric element comprises an electric-to-thermal transducing element.

4. The apparatus of claim 1 wherein the electric element comprises a permalloy element.

5. The apparatus of claim 2 wherein the electric element is a permalloy element.

6. The apparatus of claim 5 wherein the electric element is a permalloy element.

7. The apparatus of claim 1 wherein the dielectric material comprises silicon nitride.

8. The apparatus of claim 2 wherein the dielectric material comprises silicon nitride.

9. The apparatus of claim 3 wherein the dielectric material comprises silicon nitride.

10. The apparatus of claim 4 wherein the dielectric material comprises silicon nitride.

11. An integrated semiconductor device, comprising:
    a semiconductor body having a depression formed into a first surface of the body, the semiconductor body comprising (100) silicon and having a (100) plane and a <110> direction, the first surface of the semiconductor body being substantially parallel to the (100) plane;
    a layer of thin film dielectric material covering at least a portion of the first surface; and
    a slotted diaphragm comprising the layer of thin film material and further comprising an electric element and forming a slotted diaphragm substantially covering the depression, a single slot extending across the diaphragm from one extremity to the other, the slot having first and second ends intersecting the first surface of the semiconductor body, the slot being oriented at substantially 45 degrees to the <110> direction and extending across the depression at the approximate center of the depression, the static electric element being substantially supported by the diaphragm and, therefore, substantially thermally and physically isolated from the semiconductor body.

12. The apparatus of claim 11 wherein the static electric element comprises a thermal-to-electric transducing element.

13. The apparatus of claim 11 wherein the electric element is an electric-to-thermal transducing element.

14. The apparatus of claim 11 wherein the electric element comprises a permalloy element.

15. The apparatus of claim 12 wherein the electric element comprises a permalloy element.

16. The apparatus of claim 13 wherein the electric element comprises a permalloy element.

17. The apparatus of claim 11 wherein the dielectric material comprises silicon nitride.

18. The apparatus of claim 12 wherein the electric element comprises a permalloy element.

19. A flow sensor comprising:
  a semiconductor body having a depression formed into a first surface of the body, the semiconductor body comprising (100) silicon and having a (100) plane and a <110> direction, the first surface of the semiconductor body being substantially parallel to the (100) plane;
  a layer of thin film material covering at least a portion of the first surface and forming a slotted diaphragm substantially covering the depression, the slotted diaphragm comprising slot means oriented at substantially 45 degrees to the <110> direction and extending across the depression at the approximate center of the depression;
  a thin film heater supported over the depression by the diaphragm, approximately half of the heater being located on each side of the slot; and
  a pair of thin film heat sensors supported by the diaphragm, the thin film sensors being disposed on opposite sides of the heater.

20. The apparatus of claim 19 wherein the heater is operated at a temperature elevated above ambient, thus creating a no-flow temperature gradient in the air above and adjacent to the heater, the temperature within the no-flow gradient making a transition between the elevated temperature and substantially ambient temperature, the sensors being located sufficiently close to the heater to be located substantially within the no-flow temperature gradient.

21. The apparatus of claim 19 wherein the thin film heater and sensors each comprise a permalloy element.

22. The apparatus of claim 19 wherein the layer of thin film material comprises a dielectric material.

23. The apparatus of claim 22 wherein the dielectric material comprises silicon nitride.

24. The apparatus of claim 19 wherein the sensors are located from the heater at a preferred distance which, when contrasted to an alternate distance, provides a substantially greater change in the heat being delivered to the sensors for a given change in flow rate.

25. The apparatus of claim 24 wherein the heater is operated at a temperature elevated above ambient, thus creating a no-flow temperature gradient in the air above and adjacent to the heater, the temperature within the no-flow gradient making a transition between the elevated temperature and substantially ambient temperature, the sensors being located sufficiently close to the heater to be located substantially within the no-flow temperature gradient.

26. The apparatus of claim 24 wherein the thin film heater and sensors each comprise a permalloy element.

27. The apparatus of claim 24 wherein the layer of thin film material comprises a dielectric material.

28. The apparatus of claim 22 wherein the dielectric material comprises silicon nitride.

29. The apparatus of claim 28 wherein the proximal edges of the sensors are located from the near edges of the heater at a distance within the range of approximately 5 microns to approximately 25 microns.

30. The apparatus of claim 29 wherein the heater is operated at a temperature elevated above ambient, thus creating a no-flow temperature gradient in the air above and adjacent to the heater, the temperature within the no-flow gradient making a transition between the elevated temperature and substantially ambient temperature, the sensors being located sufficiently close to the heater to be located substantially within the no-flow temperature gradient.

31. The apparatus of claim 29 wherein the thin film heater and sensors each comprise a permalloy element.

32. The apparatus of claim 29 wherein the layer of thin film material comprises a dielectric material.

33. The apparatus of claim 32 wherein the dielectric material comprises silicon nitride.

34. The apparatus of claim 19 wherein the heater and each sensor comprise a resistive element having a pattern of resistive material formed in lines having a line width, the lines being separated by substantially a line width, the sensors being separated from the heater by a distance in the range of approximately one line width to approximately five line widths.

35. The apparatus of claim 34 wherein the heater is operated at a temperature elevated above ambient, thus creating a no-flow temperature gradient in the air above and adjacent to the heater, the temperature within the no-flow gradient making a transition between the elevated temperature and substantially ambient temperature, the sensors being located sufficiently close to the heater to be located substantially within the no-flow temperature gradient.

36. The apparatus of claim 34 wherein the thin film heater and sensors each comprise a permalloy element.

37. The apparatus of claim 34 wherein the layer of thin film material comprises a dielectric material.

38. The apparatus of claim 37 wherein the dielectric material comprises silicon nitride.

39. An integrated semiconductor device, comprising:
  a semiconductor body with a first surface having a predetermined orientation with respect to a crystalline structure in the semiconductor body, the semiconductor body having a depression formed into the first surface of the body;
  a layer of thin film dielectric material covering at least a portion of the first surface;
  a slotted diaphragm comprising the layer of thin film material and further comprising an electric element, the slotted diaphragm substantially covering the depression, wherein the slotted diaphragm further comprises a slot means including a plurality of spaced axially aligned slots extending across the diaphragm from one extremity to the other, each said slot exposing a defined area of the first surface of the semiconductor body, the axial separation between said slots being less than the slot width, the slot means being substantially defining the center of the diaphragm and being oriented so that, in the fabrication of the device, an anisotropic etch placed in each slot will undercut the diaphragm and form the depression, the static electric element being substantially supported by the diaphragm and, therefore, substantially thermally and physically isolated from the semiconductor body.

40. The apparatus of claim 39 wherein the static electric element comprises a thermal-to-electric transducing element.

41. The apparatus of claim 39 wherein the electric element comprises an electric-to-thermal transducing element.

42. The apparatus of claim 40 wherein the electric element comprises a permalloy element.

43. The apparatus of claim 41 wherein the electric element comprises a permalloy element.

44. The apparatus of claim 39 wherein the dielectric material comprises silicon nitride.

45. The apparatus of claim 40 wherein the dielectric material comprises silicon nitride.

46. The apparatus of claim 41 wherein the dielectric material comprises silicon nitride.

47. The apparatus of claim 42 wherein the dielectric material comprises silicon nitride.

48. An integrated semiconductor device, comprising:
a semiconductor body having a depression formed into a first surface of the body, the semiconductor body comprising (100) silicon and having a (100) plane and a <110> direction, the first surface of the semiconductor body being substantially parallel to the (100) plane;
a layer of thin film dielectric material covering at least a portion of the first surface; and
a slotted diaphragm comprising the layer of thin film material and further comprising an electric element, the slotted diaphragm substantially covering the depression, wherein the slotted diaphragm further comprises a slot means including a plurality of spaced axially aligned slots extending across the diaphragm from one extremity to the other, each said slot exposing a defined area of first surface of the semiconductor body, The axial separation between said slots being less than the slot width, the slot means being substantially centered on the diaphragm, and being oriented so that, in the fabrication of the device, an anisotropic etch placed in each slot will undercut the diaphragm and form the depression, the static electric element being substantially supported by the diaphragm and, therefore, substantially thermally and physically isolated from the semiconductor body.

49. The apparatus of claim 40 wherein the static electric element comprises a thermal-to-electric transducing element.

50. The apparatus of claim 48 wherein the electric element comprises an electric-to-thermal transducing element.

51. The apparatus of claim 49 wherein the electric element comprises a permalloy element.

52. The apparatus of claim 59 wherein the electric element comprises a permalloy element.

53. The apparatus of claim 48 wherein the dielectric material comprises silicon nitride.

54. The apparatus of claim 49 wherein the electric material comprises silicon nitride.

55. The apparatus of claim 50 wherein the dielectric material comprises silicon nitride.

56. The apparatus of claim 51 wherein the dielectric material comprises silicon nitride.

57. The apparatus of claim 19 wherein said slot means comprises a plurality of spaced axially aligned slots extending across the diaphram, the axial separation between said slots being less than the slot width.

* * * * *

UNITED STATES PATENT AND TRADEMARK OFFICE
CERTIFICATE OF CORRECTION

PATENT NO. : 4,825,693

DATED : May 2, 1989

INVENTOR(S) : Bohrer et al

It is certified that error appears in the above-identified patent and that said Letters Patent is hereby corrected as shown below:

Column 10, line 28, cancel "static".

Column 11, line 16, cancel "12", substitute --17--.

Column 12, line 3, cancel "22", substitute --27-- and line 5, cancel "28" and substitute --19--.

Column 14, line 22, cancel "59", substitute --50-- and line 30, cancel "51" and substitute --54--.

Signed and Sealed this

Second Day of January, 1990

Attest:

JEFFREY M. SAMUELS

Attesting Officer     Acting Commissioner of Patents and Trademarks